Patented Aug. 2, 1932

1,870,186

UNITED STATES PATENT OFFICE

ALBERT E. VERBYLA, OF NEWARK, NEW JERSEY

METHOD OF PREPARING PIGMENT COMPOSITIONS

No Drawing.   Application filed September 29, 1930.   Serial No. 485,310.

Pigments are ordinarily produced by precipitation in an aqueous medium. To use these pigments, they are ordinarily dried and then reground with an oily medium, in order to make them compatible with the paints or lacquers in which they are used.

I have discovered that the pigments in the aqueous medium can be directly combined with various lacquers without the necessity of reducing them to a dried state and then regrinding, by incorporating with the wet pigments a water-soluble vegetable oil, preferably a fatty acid compound of the oil, such as the acetic or propionic or butyric acid compound. The oils used may be either drying oils such as linseed oil or soya-bean oil, or a non-drying oil such as castor oil or rape seed oil.

Pigment in the form of an aqueous paste or pulp is mixed with the water-soluble oil in proportions varying over wide limits; for example, I may use from 25% to 100% by weight of oil based on the weight of the paste, but other proportions may likewise be used. The oil selected should not contain more than 5% of water, but if a non-drying oil is used the water may be driven off after the water-soluble oil is combined with the pigment. Under these circumstances the water in the entire compound can be brought down to as low as 5%. The oil can be very easily combined with the pigment which remains in its original finely divided form, not having been caked by drying. Any good mixing will be sufficient, though I prefer to insure a thorough mixing by using a coarse paint mill of large capacity.

I find that following this procedure I am able to produce a product which can readily be incorporated in lacquers such as cellulose ester lacquers especially of the flexible type such as are used for artificial leather, and in leather finishing compounds, and may be used for various purposes by the addition of further quantities of oil. My invention can readily be understood from the following examples:

Example No. 1.—100 pounds of prussian blue water wet paste containing approximately 50% of water was thoroughly mixed with 75 pounds of acetated castor oil containing about 5% of water. This paste was dried at a moderate temperature until the entire water content was reduced to 10%. The material still remained in the form of a smooth paste and was readily miscible with lacquers in the usual way.

Example No. 2.—100 pounds of lead chromate water wet paste containing approximately 30% of water was mixed with 25 pounds of acetated linseed oil containing about 5% of water. 10 parts by weight of the resulting paste were then mixed with 30 parts ethyl acetate, 40 parts toluol, 10 parts butyl acetate and 10 parts absolute denatured ethyl alcohol. To this cellulose nitrate was added to give the desired hardness and viscosity for making a lacquer.

It is understood that the examples given are by way of illustration only and not to be interpreted as limiting the scope of my invention.

What I claim is:

1. A new composition of matter comprising a finely divided pigment, water, and a fatty acid compound of a vegetable oil such fatty acid having not more than four carbon atoms.

2. A new composition of matter comprising a finely divided pigment, water and an acetated vegetable oil.

In testimony that I claim the foregoing, I have hereunto set my hand this 26th day of September, 1930.

ALBERT E. VERBYLA.